United States Patent [19]

Taylor

[11] 4,016,861
[45] Apr. 12, 1977

[54] SOLAR HEATING SYSTEM

[76] Inventor: Max F. Taylor, Rte. 1, Whitewater, Wis. 53190

[22] Filed: July 2, 1975

[21] Appl. No.: 592,499

[52] U.S. Cl. .............................. 126/270; 126/400; 165/166

[51] Int. Cl.² .......................................... F24J 3/02

[58] Field of Search .................. 126/270, 271, 400; 165/166; 29/191.6, 193.5

[56] References Cited

UNITED STATES PATENTS

| | | | |
|---|---|---|---|
| 659,450 | 10/1900 | McHenry | 237/1 A |
| 2,671,441 | 3/1954 | Harris | 126/270 |
| 2,680,565 | 6/1954 | Lof | 126/270 |
| 3,089,670 | 5/1963 | Johnson | 126/270 |
| 3,250,269 | 5/1966 | Sherock | 126/271 |

FOREIGN PATENTS OR APPLICATIONS 1,097,233 7/1955 France ........................ 126/271

Primary Examiner—Kenneth W. Sprague
Assistant Examiner—James C. Yeung
Attorney, Agent, or Firm—Wheeler, Morsell, House & Fuller

[57] ABSTRACT

A solar heat collector is formed by a unitary top plate having spaced apart downwardly extending tabs, a unitary bottom plate having spaced apart upwardly extending tabs, a frame holding the plates together in spaced apart relationship with the tabs intermeshed, and a backing plate held in the frame under the bottom plate. The upper surfaces of all plates and tabs are painted black to better absorb solar heat. Air is circulated between the heat collector and a porous heat storage unit to transfer heat from the collector to the storage unit, the tabs of the heat collector serving both as heat absorbent surfaces and as baffles to maximize heat transfer from the heat collector to the air stream. The tabs can be formed by making a plurality of H-shaped cuts in the top and bottom plates and then bending the inner margins of each H-shaped cut away from the plane of the corresponding plate to form two tabs. A looped water conduit can be mounted on staggered supporting panels within the heat storage unit, the staggered supporting panels acting as baffles to maximize air stream contact with the looped conduit to thus maximize heat transfer to the water therein.

9 Claims, 10 Drawing Figures

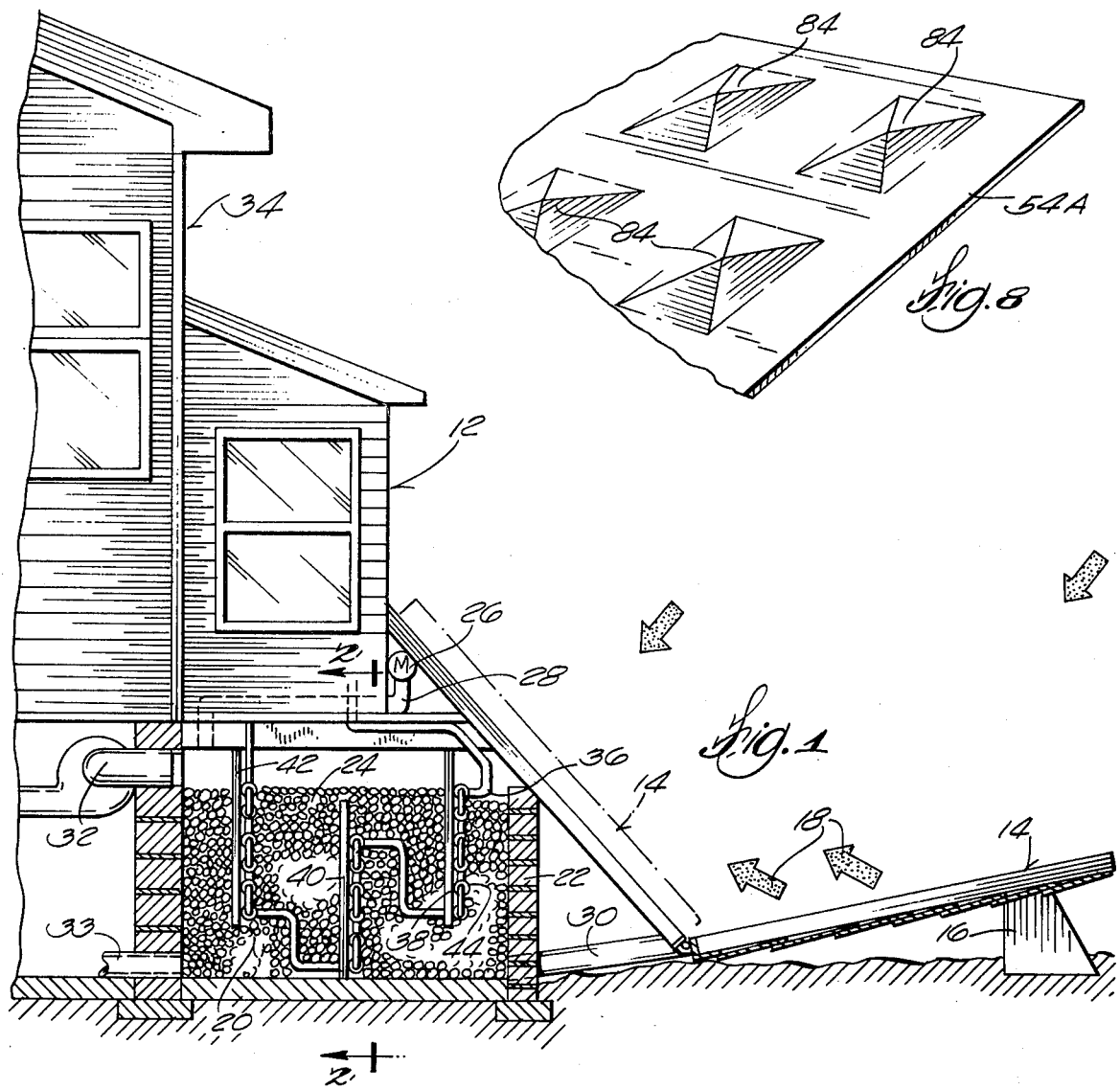
Fig. 8
Fig. 1
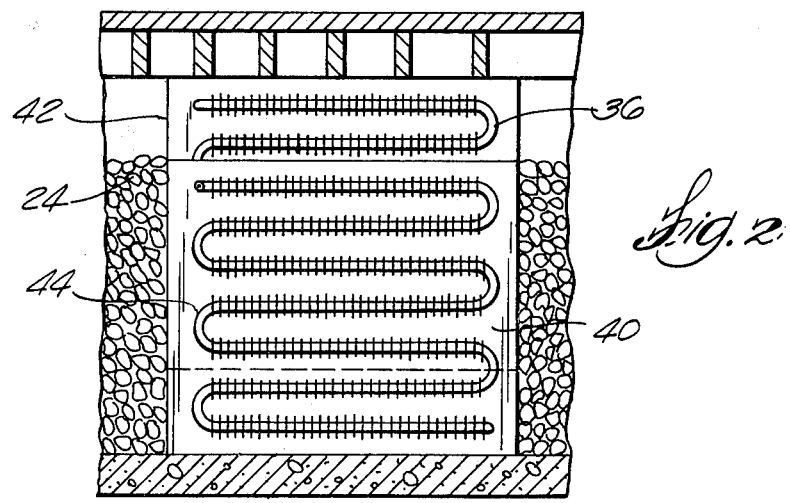
Fig. 2

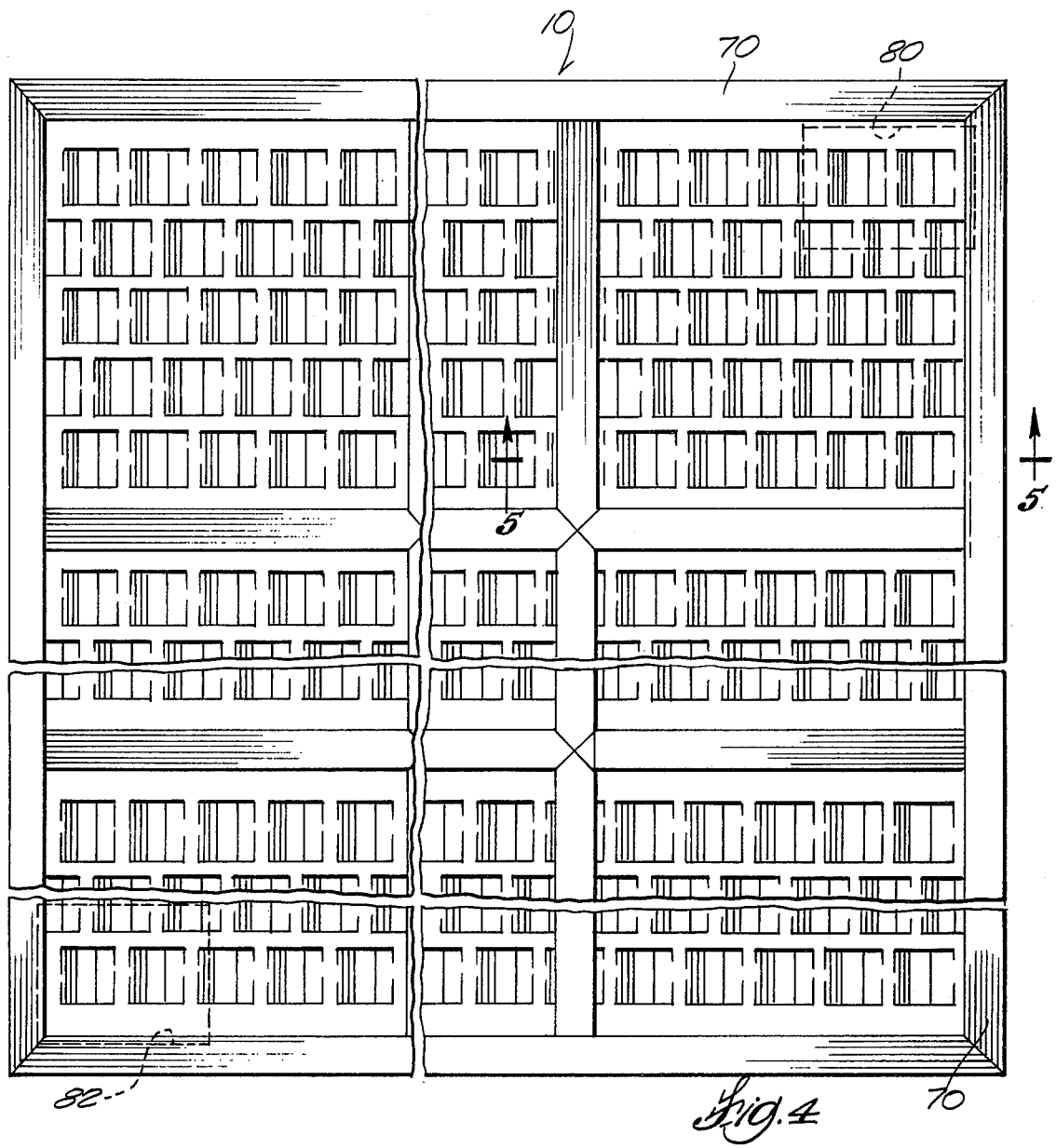
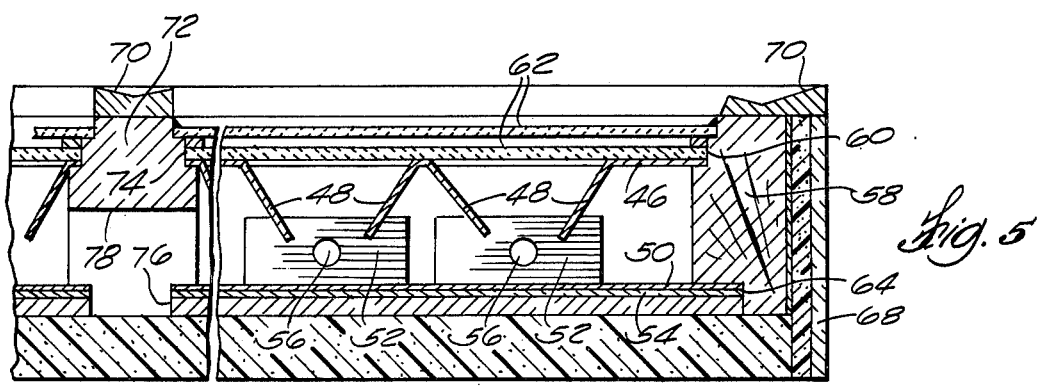

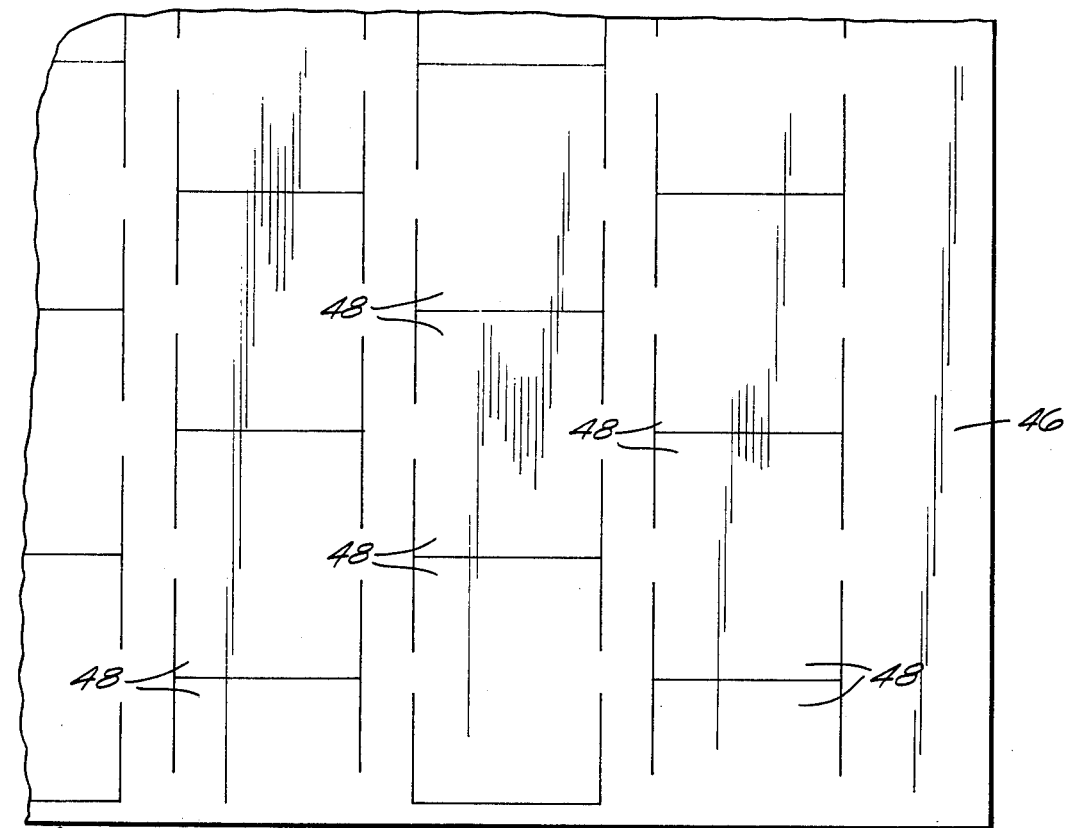
Fig. IB
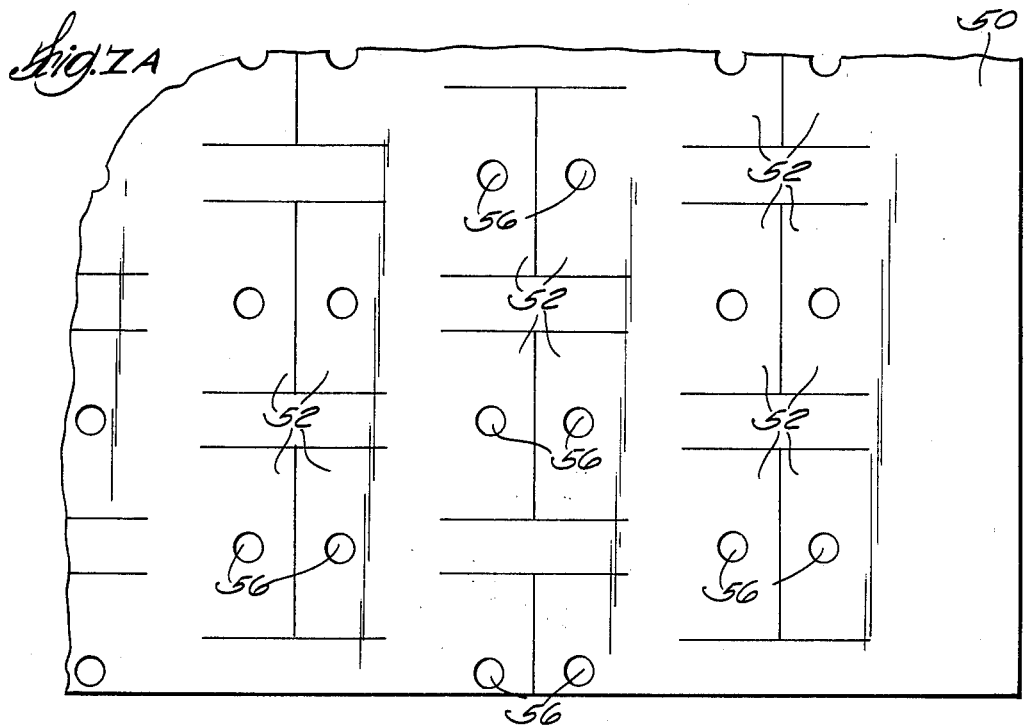
Fig. IA

SOLAR HEATING SYSTEM

BACKGROUND OF INVENTION

This invention relates to solar heating systems and more particularly to the solar heat collector portion and water heating portion thereof. In solar heating systems, the heat collector portion is exposed to the sun to absorb heat therefrom. Air is circulated between the heat collector portion and a porous heat storage unit, which can be a bed of small rocks, to transfer heat from the heat collector to the heat storage unit. Air is then circulated between the heat storage unit and the space which is to be heated. A water conduit can be mounted in the heat storage unit to heat water from the stored heat and from the heat carried in the airstream circulating through the heat storage unit.

This invention is directed to improvements in the structure of the solar heat collector and in the mounting arrangement for the water conduit within the heat storage unit.

SUMMARY OF THE INVENTION

The solar heat collector of this invention includes a unitary top plate having a plurality of spaced apart downwardly extending tabs, a unitary bottom plate having a plurality of spaced apart upwardly extending tabs, a frame supporting the top and bottom plates in spaced apart relation with the tabs intermeshed, and a backing plate supported in the frame under the bottom plate. The tabs can be formed by making a plurality of H-shaped cuts in the top and bottom plates and then bending the inner margin of each H-shaped cut away from the plane of the corresponding plate to form two tabs. In accordance with a further aspect of this invention, a water conduit can be mounted on staggered supporting panels acting as baffles to maximize air stream contact with the conduit to thus maximize heat transfer to the water therein.

DESCRIPTION OF THE DRAWINGS

FIG. 1 is a side elevational view, partially cut away, showing the major portions of a solar heating system utilizing the solar heat collector and water conduit support of this invention.

FIG. 2 is a detail cross-sectional view taken on the line 2—2 of FIG. 1.

FIG. 4 is a top plan view of the solar heat collector of this invention in its frame.

FIG. 5 is a cross-sectional view taken on the line 5—5 of FIG. 5.

FIGS. 7A and 7B show a modified pattern of H-shaped cuts utilized in the top and bottom plates to form the tabs thereof.

FIG. 8 is a fragmentary perspective view of a backing plate having pyramidal bosses formed therein to reduce heat loss by re-radiation.

DESCRIPTION OF THE PREFERRED EMBODIMENT

Figure 3:
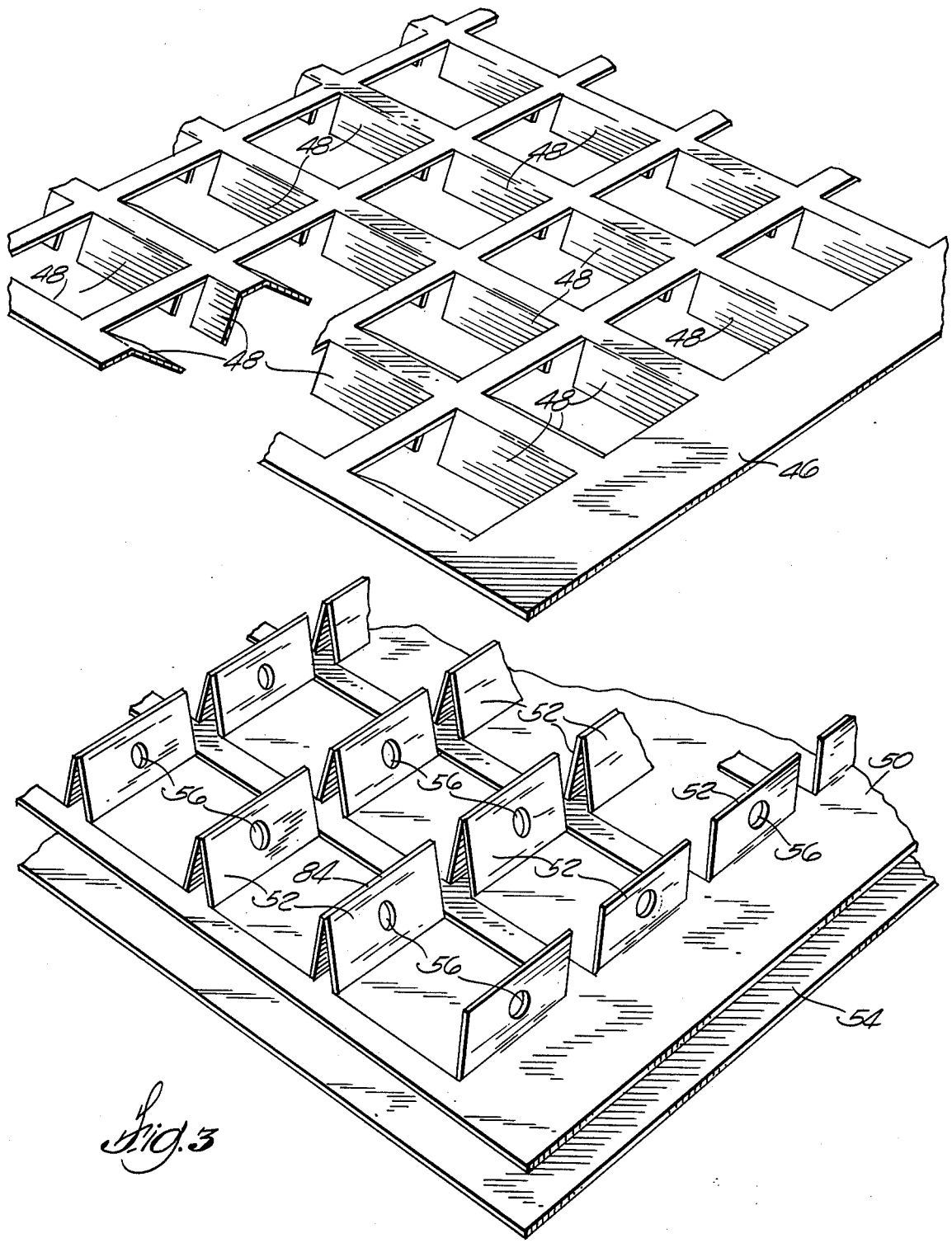
FIG. 3 is an exploded perspective view of the solar heat collector of this invention outside its frame.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows the major portions of a solar heating system utilizing the solar heat collector and water conduit support of this invention. The solar heat collector 10 is contained in a hollow rectangular frame as shown in FIGS. 4 and 5 and described hereinafter. Solar heat collector 10 is mounted on the front of a porch 12 in such position, and at such angle, as to be exposed to the sun in winter to effectively absorb heat therefrom. A reflecting cover 14 which has a reflecting surface on its inner side and is covered with siding on its outer side is hinged at its bottom edge to solar heat collector 10. When the solar heating system is not in use, reflecting cover 14 is swung to its closed position, indicated by the dashed lines in FIG. 1, and provides a decorative cover for solar heat collector 10. In its open position, indicated by the solid lines in FIG. 1, reflecting cover 14 is supported by a block 16 at such an angle as to reflect sunlight onto solar heat collector 10 as indicated by arrows 18 to increase the intensity of illumination thereof.

A heat storage unit 20 is formed underneath porch 12 by a bin 22 full of relatively small rocks 24. A blower motor 26 is coupled to the top of solar heat collector 10 and to the top of bin 22 by conduit 28. The bottom of solar heat collector 10 is coupled to the bottom of bin 22 by conduit 30. Blower motor 26 causes air to circulate between solar collector 10 and heat storage unit 20 to transfer heat from collector 10 to storage unit 20. A second blower motor 32 is coupled between heat storage bin 22 and the various rooms of house 34 to circulate heated air from bin 22 to the house. Air returns to bin 22 through air return duct 33. In this arrangement, it will be understood that the heat storage capacity of rocks 24 will tend to retain the temperature of the air circulating through the house at a constant level even when the sun goes under the clouds.

To provide hot water for the house, a water conduit 36 is mounted in heat storage bin 22 on staggered supporting panels 38, 40 and 42, which can be plywood panels. Water conduit 36 is arranged in loops on the sides of panels 38–42, facing solar heat collector 10 to intercept the hot air stream entering through air conduit 30 from solar heat collector 10. The staggered location of panels 38–42 causes the panels to act as baffles to maximize air stream contact with the looped water conduit 36 to thus maximize heat transfer to the water therein. Fins 44 can be added to the looped portion of water conduit 36 to further enhance heat absorption and the surface of panels 38–42 facing conduit 36 can be lined with a reflective coating for the same purpose.

FIGS. 3–7 show the construction of solar heat collector 10. Referring to FIG. 3, each section of solar heat collector 10 includes a unitary top plate 46 having spaced apart downwardly extending tabs 48, a unitary bottom plate 50 having spaced apart upwardly extending tabs 52, and a back plate 54 underneath bottom plate 50. Circulation openings 56 are formed in tabs 52 in this example, although they are not essential to the invention. The solar heat collector also includes frame means for holding plates 46 and 50 together in spaced apart relationship with tabs 48 intermeshed with tabs 52 and with backing plate 54 under bottom plate 50.

A typical frame is illustrated in FIGS. 4 and 5. The frame includes wooden 2 × 4 side framing members 58 (FIG. 5) which are recessed at 60 to receive the edges of top plate 46 and a double pane glass top 62 which provides a transparent air-tight cover for the solar heat collector. Framing member 58 is recessed at 64 to receive the edges of bottom plate 50 and backing plate 54 which are supported by a plywood bottom panel 56. Plates 46 and 50 are held in spaced apart relationship with tabs 48 intermeshed with tabs 52 to create a plurality of rectangular heating chambers each defined by an adjacent pair of tabs 48 and an adjacent pair of tabs 52. The upper surfaces of plates 46, 50 and 54, and tabs 48 and 52, are preferably painted black to better absorb solar heat. An insulation pad 66 on the bottom of the frame retards loss of heat therethrough.

The exterior edge of framing members 58 are covered by a decorative trim of redwood panels 68, and redwood molding 70 covers the top of framing members 58. The interior edges of plates 46, 50 and 54 are supported by wooden 2 × 4 framing members 72 which are recessed at 74 to receive glass top 62 and top plate 46 and are recessed at 76 to receive bottom plate 50, backing plate 54 and panel 56. The lower section of framing members 72 is cut away at 78 to provide air circulation between the adjacent panels of solar heat collector 10. Air enters solar heat collector 10 at an air inlet opening 80 (FIG. 4) in one corner of heat collector 10 and exits through an air outlet 82 in the diagonally opposite corner of heat collector 10. As the air passes through solar heat collector 10, the airstream is repeatedly baffled by the intermeshed tabs 48 and 52, which act both as heat absorbing surfaces and as baffles to maximize the transfer of heat to the airstream flowing through heat collector 10.

Figure 6B:
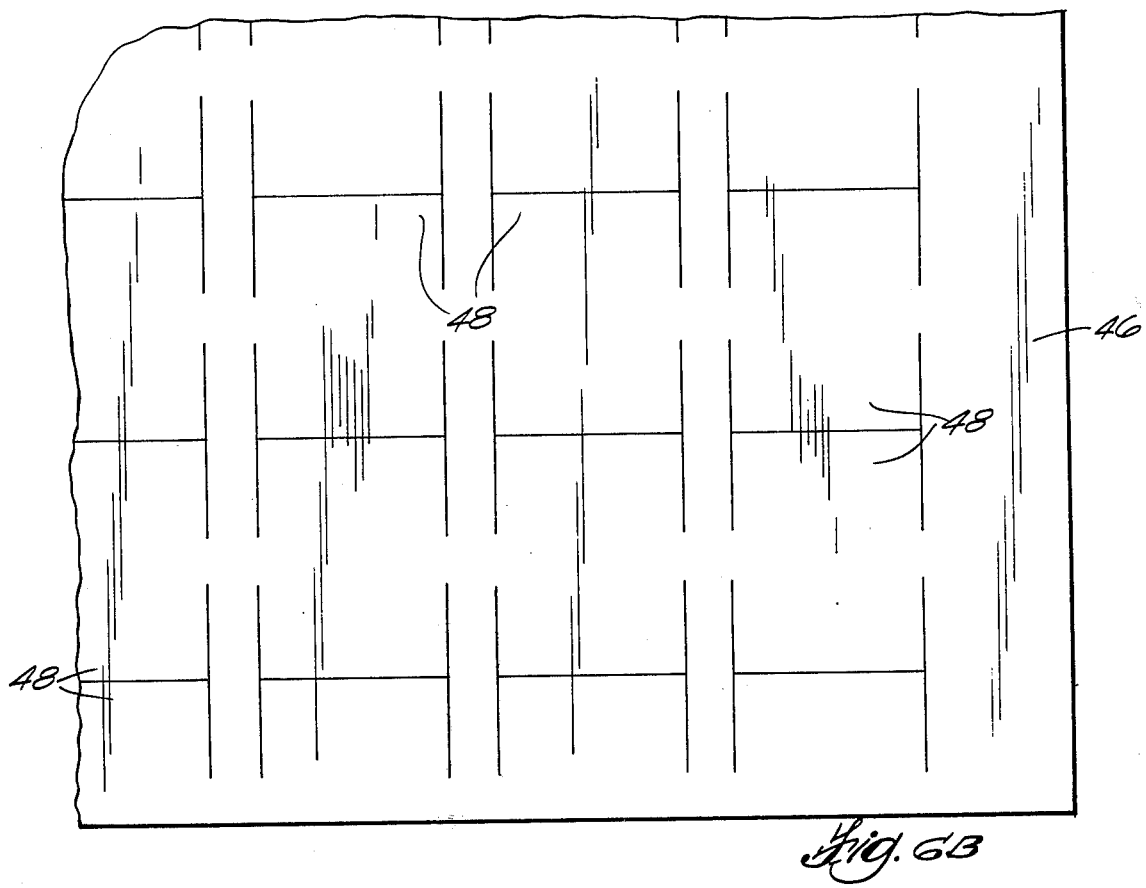
FIGS. 6A and 6B show a pattern of H-shaped cuts utilized in the top and bottom plates to form the tabs thereof.
Figure 6A:
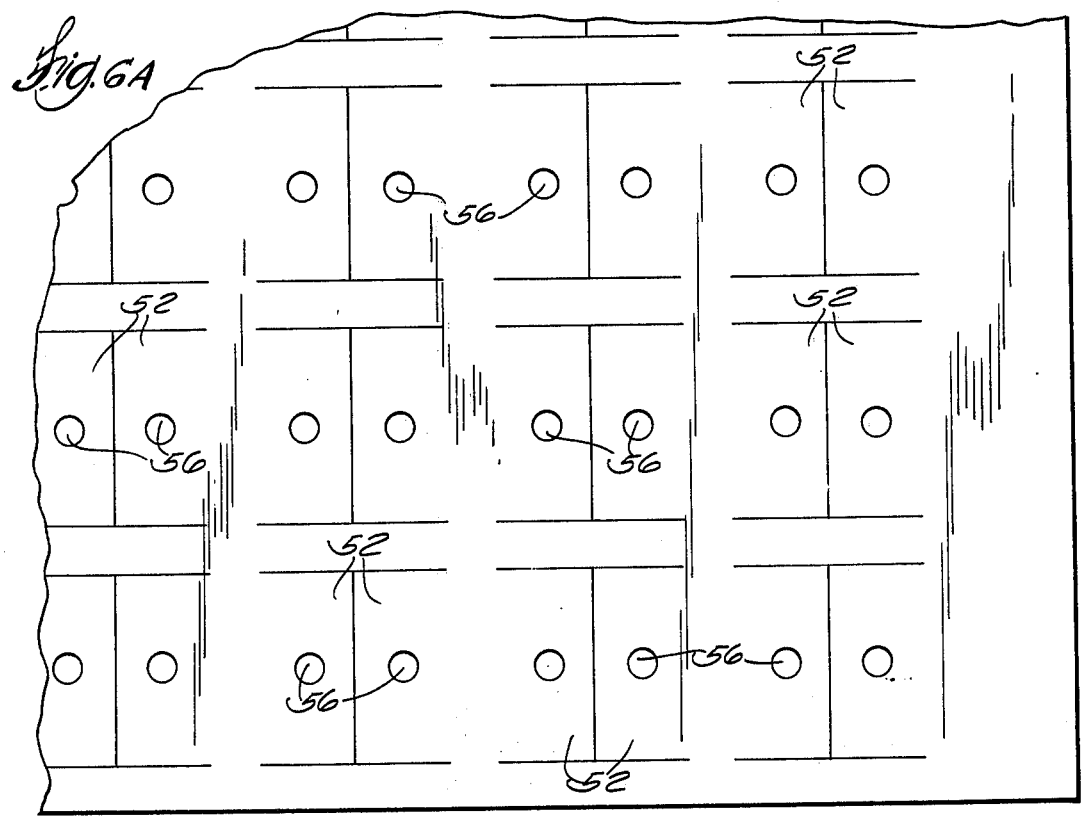

Downwardly extending tabs 48 and upwardly extending tabs 52 can be formed by making H-shaped cuts in plates 46 and 50 and then bending the inner margins of the H-shaped cuts away from the plane of the plates. If desired, the cutting and bending can be performed simultaneously in a single stamping operation. FIGS. 6A and 6B show one pattern of H-shaped cuts which can be employed to form tabs 48 and 52, and FIGS. 7A and 7B show another pattern in which the H-shaped cuts are staggered in adjacent rows like bricks. In both patterns, the H-shaped cuts in plates 46 and 50 are the same size. The H-shaped cuts in plates 46 and 50 are oriented at right angles to each other to form rectangular heating chambers when tabs 48 and 52 are intermeshed as shown in FIG. 5. However, it should be understood that this invention is not limited to rectangular heating chambers since triangular, hexagonal, and other shapes can be employed if desired.

The downwardly extending tabs 48 of top plate 46 are bent away from the plane of plate 46 by an acute angle A (FIG. 3) which in this case is approximately equal to 45 degrees. The upwardly extending tabs 52 of bottom plate 50 are bent away from the plane of plate 50 by an obtuse angle B (FIG. 3) which is large enough to permit the upper margins 84 of adjacent tabs 52 to contact each other.

Solar heat collector 10 is made up of a plurality of sections such as shown in FIGS. 3 and 5 mounted in a rectangular wooden frame as shown in FIGS. 4 and 5. The size of any given solar heat collector 10 depends on the desired heat capacity, which is directly proportional to the size of the sections and the number of sections employed.

FIG. 8 shows a modified backing plate 54A having pyramidal bosses 84 formed therein and positioned to underlie the rectangular heating chambers formed by downwardly extending tabs 48 and upwardly extending tabs 52. The downwardly sloping sides of pyramidal bosses 84 direct re-radiated heat toward tabs 48 and 52 rather than out the openings in the top plate 46, thus reducing heat loss from solar heat collector 10 due to re-radiation. In the case where the openings in top plate 46 are triangular or hexagonal, bosses 84 will be shaped to match.

I claim:

1. A solar heat collector comprising a unitary top plate having a plurality of spaced apart downwardly extending tabs formed from the material of said top plate, there being a plurality of openings in said top plate each located between a corresponding pair of said tabs, a unitary bottom plate having a plurality of spaced apart upwardly extending tabs formed from the material of said bottom plate, there being a plurality of openings in said bottom plate each located between a corresponding pair of said tabs, frame means supporting said top and bottom plates in spaced apart relationship with the tabs intermeshed to form a plurality of heating chambers each bounded by a pair of said downwardly extending tabs and a pair of said upwardly extending tabs, first and second means covering the openings in said top and bottom plates and an air inlet and outlet in said frame to permit a stream of air to be moved through said heating chambers and wherein said first means is transparent.

2. The solar heat collector defined in claim 1 wherein said downwardly extending tabs are oriented at right angles to said upwardly extending tabs and wherein said heating chambers are substantially rectangular in plan shape.

3. The solar heat collector defined in claim 1 and further comprising air circulation openings in said upwardly extending tabs.

4. The solar heat collector defined in claim 1 wherein said downwardly extending tabs are bent downwardly from the plane of said top plate at an acute angle and wherein said upwardly extending tabs are bent upwardly from the plane of said bottom plate at an obtuse angle.

5. The solar heat collector defined in claim 1 and also including a porous heat storage unit, means for circulating air through said solar heat collector and said storage unit to transfer heat from said collector to said storage unit, means for circulating air through said heat storage unit and through an enclosed space which is to be heated by heat from the heat storage unit, and a water conduit passing through said heat storage unit to heat the water therein.

6. The solar heating system defined in claim 5 wherein said water conduit is arranged in loops and is supported on a plurality of spaced apart staggered supporting plates to maximize air circulation over said conduit transferring heat from said solar collector to the water in said conduit.

7. The solar heat collector defined in claim 1 wherein the second means means comprises a backing plate supported in said frame under said bottom plate and further comprising a plurality of upstanding bosses with downwardly sloping sides on said backing plate, said bosses being positioned under the openings in said bottom plate to direct re-radiated heat toward said tabs rather than out the openings in said top plate, thus reducing heat loss due to re-radiation.

8. The solar heat collector defined in claim 1 and further comprising a coating of heat absorbent material on the surfaces of said tabs which are to be exposed to sunlight.

9. The solar heat collector defined in claim 1 wherein the lower edge of said downwardly extending tabs is below the upper edge of said upwardly extending tabs.

* * * * *